United States Patent [19]

Frownfelter

[11] 3,720,281
[45] March 13, 1973

[54] REMOTELY CONTROLLED VEHICLE
[76] Inventor: Jerald L. Frownfelter, 17237 Minnehaha Street, Granada Hills, Calif. 91344
[22] Filed: Feb. 16, 1971
[21] Appl. No.: 115,176

[52] U.S. Cl. ................. 180/6.5, 180/98, 318/587, 325/113, 343/225
[51] Int. Cl. ....... B60k 27/06, B60k 31/00, B62d 1/24
[58] Field of Search ....... 180/98, 6.5, 2; 318/16, 581, 318/587; 343/225; 325/180, 113, 115

[56] References Cited

UNITED STATES PATENTS

| 3,563,327 | 2/1971 | Mier | 180/98 X |
|---|---|---|---|
| 3,011,580 | 12/1961 | Reid | 180/98 |
| 3,039,554 | 6/1962 | Hosking et al. | 180/79.1 X |
| 3,293,600 | 12/1966 | Gifft | 180/98 X |
| 2,766,426 | 10/1956 | Wilhelm | 180/98 X |
| 3,053,478 | 9/1962 | Davenport et al. | 343/225 X |
| 3,276,019 | 9/1966 | Fackler | 325/180 X |
| 2,228,692 | 1/1941 | Davies | 325/180 X |
| 2,836,253 | 5/1958 | Lovell | 180/2 X |
| 3,473,623 | 10/1969 | Meek, Jr. | 180/79.1 |
| 3,303,821 | 2/1967 | Harris | 180/6.5 X |

Primary Examiner—Benjamin Hersh
Assistant Examiner—John P. Silverstrim
Attorney—Jessup & Beecher

[57] ABSTRACT

A three-wheeled remotely controlled vehicle is provided whose direction, speed and braking are automatically controlled by a remote transmitter. The signal from the transmitter is radiated to an electronic power control unit on the vehicle, and the power control unit causes a control to be exerted on the rear wheels of the vehicle. The front wheel of the vehicle is swively mounted to be freely rotatable about a vertical axis. The direction, speed and braking of the vehicle are controlled by individually controlling the rotation and direction of rotation of the rear wheels of the vehicle independently of one another.

10 Claims, 7 Drawing Figures

PATENTED MAR 13 1973 3,720,281
SHEET 1 OF 3
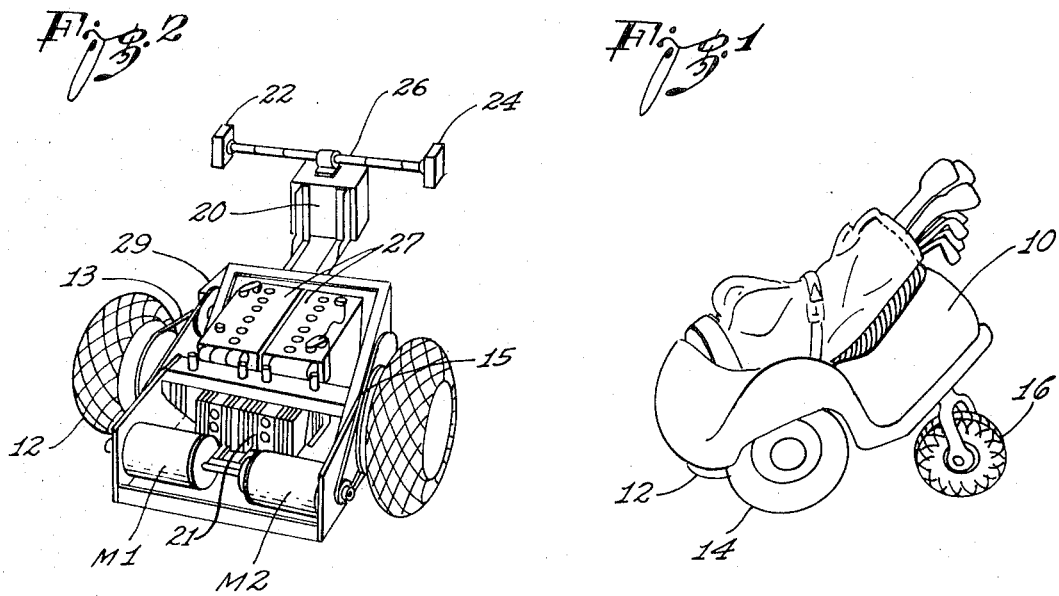
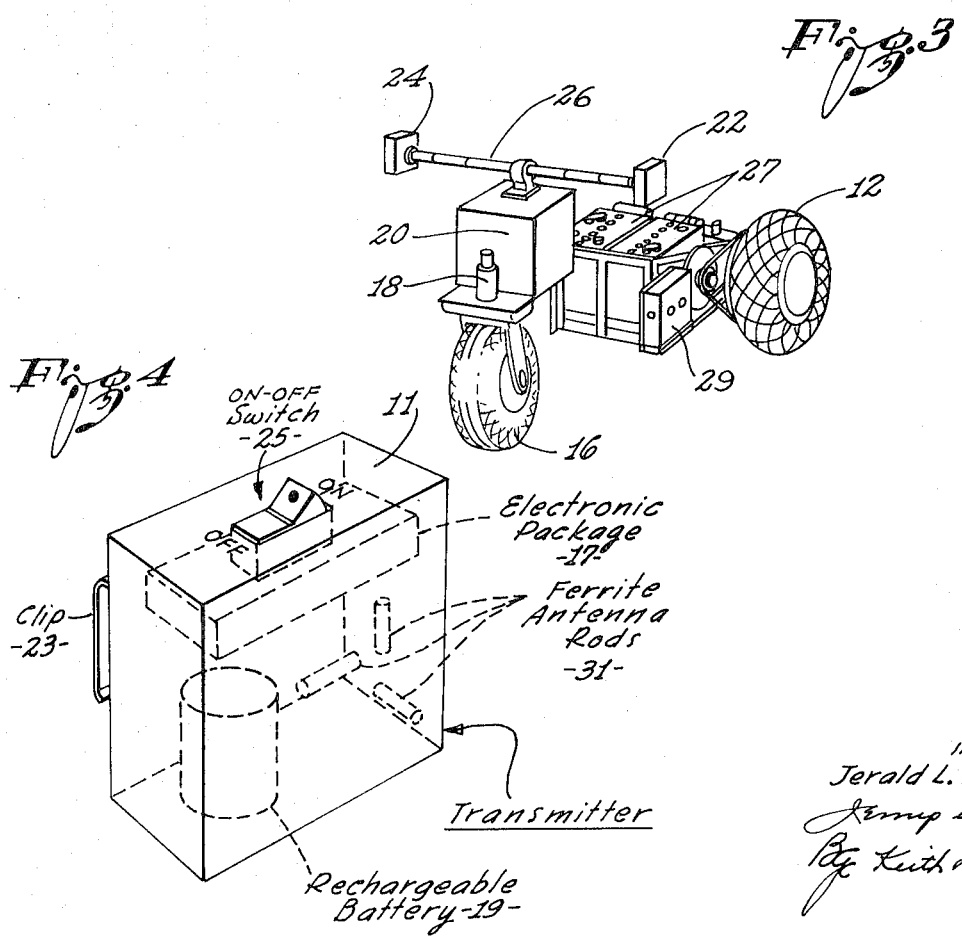
INVENTOR:
Jerald L. Frownfelter
Kemp and Beecher
By Keith D. Beecher
ATTORNEYS

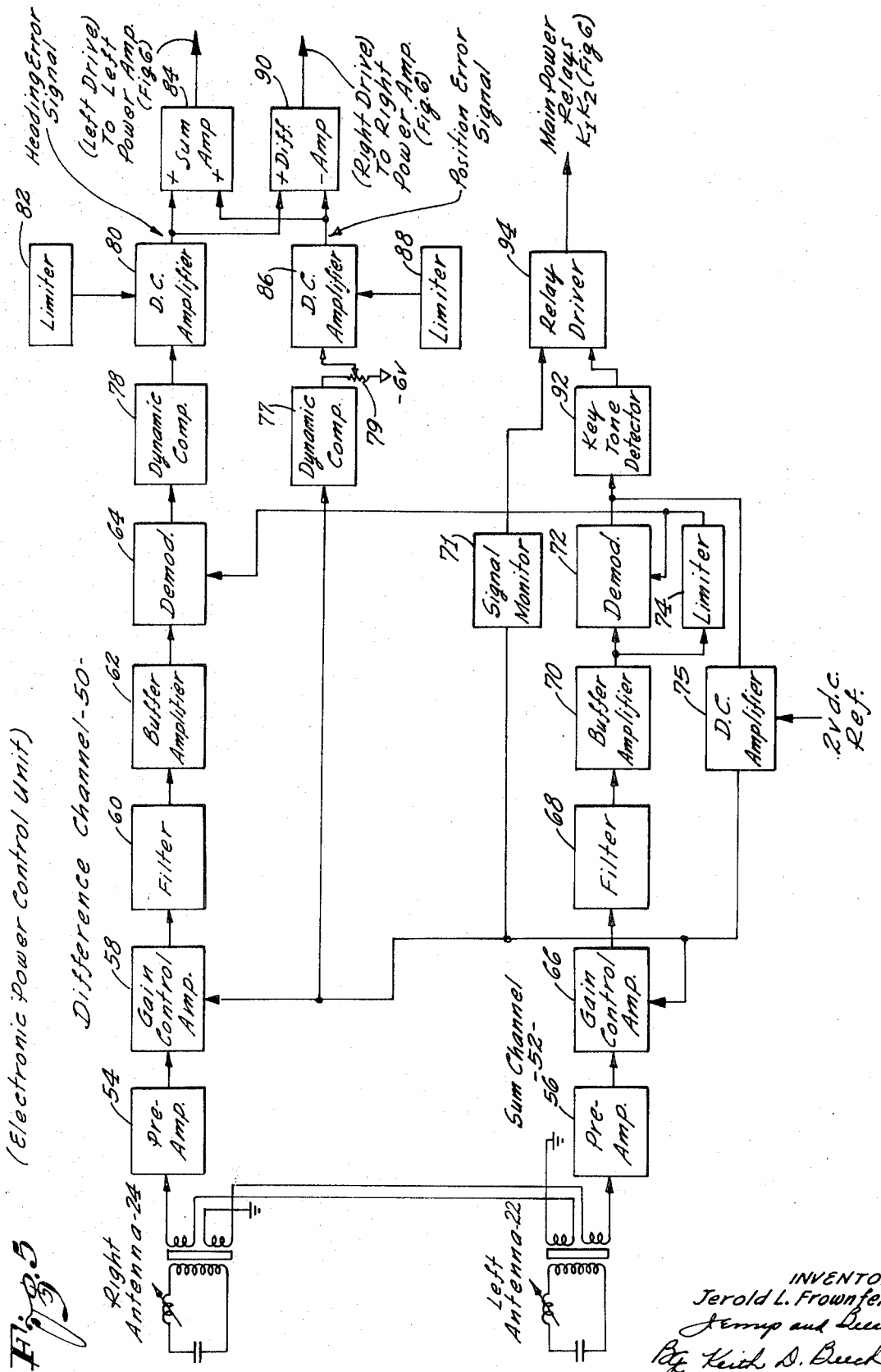

REMOTELY CONTROLLED VEHICLE

BACKGROUND OF THE INVENTION

The invention has particular utility in conjunction with wheeled vehicles for carrying players' clubs around a golf course, and will be described in such an environment. Remotely controlled wheeled golf club carriers are known, and one type of such a carrier is described, for example, in U.S. Pat. No. 3,472,333, which issued Oct. 14, 1969 to Hugo Loewenstern, Jr. The principal objective of the present invention is to provide an improved and simplified remotely controlled carrier of the general type described in the Loewenstern patent.

For example, as mentioned above, the embodiment of the invention to be described comprises a three-wheeled, electrically propelled golf club carrier whose motion, speed, direction and braking are controlled by an electronic power control unit mounted on the vehicle. The electronic power control unit, in turn, is activated by the reception of signals transmitted by a remote transmitter. The transmitter may be encased in a unitary housing which is carried by the person controlling the vehicle, and the signal radiated by the transmitter causes the carrier to follow the person.

In a constructed embodiment of the invention, for example, the golf club carrier is controlled to follow the person with the transmitter at a distance of from 6 to 8 feet. The vehicle enters a reverse mode and backs up when the person approaches it within the aforesaid distance. In addition, on a down-slope, any tendency for the vehicle to close the distance between it and the controlling person results in the drive motors of the vehicle entering a reverse mode and acting as power brakes for the vehicle.

An important feature of the vehicle and control system of the present invention is the mounting of the front wheel of the vehicle on a swivel mount for free rotation about a vertical axis. The vehicle is steered by the independent forward and reverse rotational control of its rear wheels, rather than by attempting to provide any distinct steering function for the front wheel of the vehicle, as is the case in the prior art systems. As the rear wheels of the vehicle of the present invention are independently controlled by the electronic power control unit to perform the steering function, the front wheel rotates freely about the aforesaid vertical axis on its swivel mount.

The aforesaid constructed embodiment of the invention comprises a golf club carrier which is capable of operating on grass turf with a full load of two golf bags and at a maximum speed of the order, for example, of 450 feet per minute. The speed of the vehicle is determined by the rate at which the player carrying the transmitting unit moves ahead of the vehicle. In other words, the vehicle moves at the speed the player elects to walk, and it follows the player at a distance of from 6 to 8 feet. Also, and as mentioned above, on a downhill slope, any tendency for the vehicle to close with the player is prevented by the vehicle entering a braking mode. Whenever the player carrying the transmitting unit changes the direction in which he is walking, the vehicle is automatically controlled to alter its course and, at all times, to follow a predetermined distance behind the player.

There have been numerous attempts in the prior art to achieve the functions described above. However, such attempts have, for the most part, been unsuccessful both functionally and commercially. The lack of success of the prior art units is due primarily to their complexity, and especially due to the complexity of the front wheel steering control in the prior art systems, and in which the steering function is usually performed in reliance on the variation of signal strength between two antennas mounted in relatively close proximity to one another.

Other problems in the prior art remote vehicle control systems have stemmed from the disadvantages of employing a multiplicity of switches and relays for the application of predetermined increments of power to the drive motors of most of the prior art controlled vehicles. It is well known that such switches tend to get dirty and wear out. Also, the prior art multi-switch control is incapable of providing compensation for unbalanced motors, or for unequal load distribution and unequal frictional drag as might be occasioned by faulty wheel bearings or by difference in grass structure between the wheels. Some of the prior art remote vehicle control systems, moreover, employ power rheostats which are inherently inefficient, and which are subject to excessive heat and frequent failures.

The objectives of the present invention, therefore, include the provision of a driving, steering and braking control unit for a remotely controlled powered vehicle, and which overcomes the above-mentioned disadvantages of the prior art systems of the same general nature.

As will be described, the vehicle in the system of the present invention is operated by means of a remote radio transmitter encased in a small compact unitary housing, and the control is effectuated by means of a unique electronic control circuit having infinite resolution and proportional control of both forward and reverse power applied to each of two electric motors. The electric motors are independently coupled to respective ones of the two rear drive wheels of the vehicle, whereby the relative direction and speeds of rotation of the drive wheels may be controlled in accordance with the desired performance of the vehicle, as it actually occurs, rather than by predetermined parameters of operation which are susceptible to variations.

BRIEF DESCRIPTION OF THE DRAWINGS

FIG. 1 is a perspective representation of a golf club carrier constructed to incorporate the concepts of the present invention;

FIGS. 2 and 3 are further views of the vehicle of FIG. 1, with the body removed so as to reveal the chassis, as well as the drive motors and control components of the vehicle;

FIG. 4 is a schematic representation of the transmitter used in the system of the invention, and which is encased in a small unitary housing for convenient hand carrying by the controlling person;

FIG. 5 is a block diagram of the electronic power control unit which is mounted on the vehicle of FIGS. 1-4, and which responds to remote signals from the transmitter to control the vehicle;

DETAILED DESCRIPTION OF THE ILLUSTRATED EMBODIMENT

Figure 6:
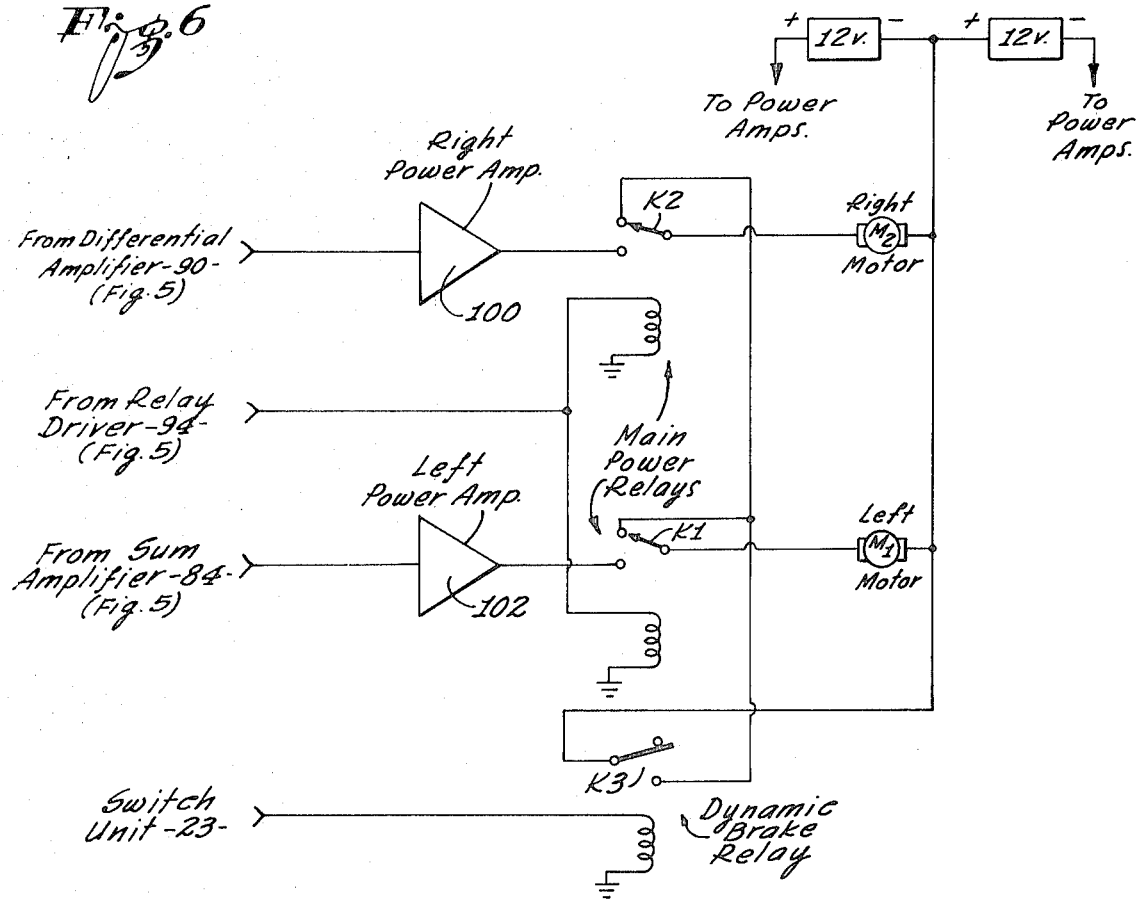
FIG. 6 is a diagram of a motor controller which also is mounted on the vehicle and which is controlled by the electronic power control unit of FIG. 5 to exert the desired control on the drive motors of the vehicle.
Figure 7:
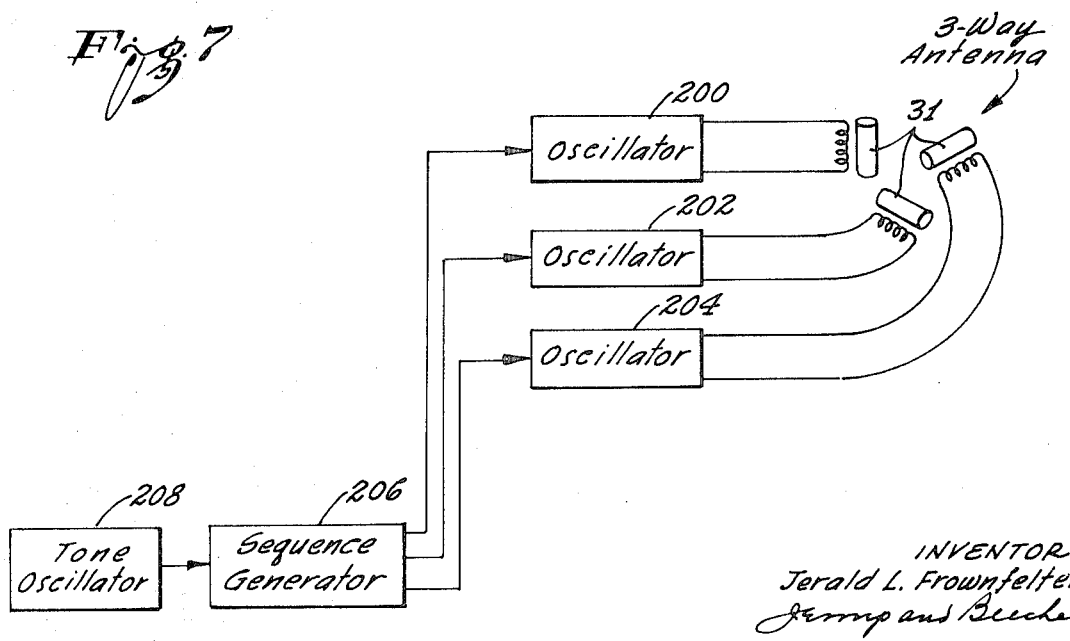
FIG. 7 is an electrical block diagram of the transmitter of FIG. 4.

As shown in FIGS. 1-3, the radio controlled vehicle of the invention may take the form of a golf club carrier 10. The vehicle is constructed to carry one or more bags of golf clubs, and it is controlled to follow a player around the golf course at a predetermined distance behind the player. The carrier 10, as shown in FIGS. 1-3, includes a left rear wheel 12 and a right rear wheel 14. The carrier also includes front wheel 16 which is suspended from an appropriate swivel mount 18 for free rotation throughout 360° about a vertical axis.

The rear wheel 12 of the carrier 10 is driven by an electric motor M1 through an appropriate chain drive 13, and the rear wheel 14 of the carrier is driven by an electric motor M2 through an appropriate chain drive 15. It is evident that other means may be used for mechanically coupling the motors M1 and M2 to the wheels 12 and 14. The electric motors M1 and M2 are independently controlled and they operate independently to control the speed and direction of rotation of the wheels 12 and 14.

An electronic power control unit 20 is mounted on the carrier 10, and it includes a left antenna 22 and a right antenna 24. The antennas 22 and 24 may take the form, for example, of vertical ferrite rods, and they are mounted on the ends of an arm 26. The antennas may be encased in appropriate plastic housings, and the arm 26 may be in the form of a plastic tubular member through which the leads from the antennas 22 and 24 extend to the control unit 20. A motor controller unit 21 is also mounted on the golf cart 10, and it responds to signals from the power control unit 20 to control the motors M1 and M2.

The transmitter portion of the system may be mounted, for example, in an appropriate housing 11, such as shown in FIG. 4. The housing 11 may be of a size so as to be conveniently carried by the controlling person. A clip 23 may be provided to permit the unit to be carried on the belt, or by other appropriate means, as the controlling person walks around the golf course. An on-off switch 25 is mounted, for example, at the top of the transmitter, so that the transmitter may be conveniently turned off by the controlling person whenever he wishes to approach the vehicle, or to move without the vehicle following him. As will be described, the vehicle is constructed so that it automatically enters a dynamic braking mode, whenever the transmitter is turned off so that it comes to an immediate stop.

An appropriate electronic package 17 is mounted within the housing 11, and the package 17, as will be described, actually includes three separate transmitters in a particular embodiment of the system. A rechargeable battery 19 is also provided in the housing 11. The battery 19 has appropriate external contacts, so that the transmitting unit may be plugged into a receptacle on the vehicle when not in use, so that the battery 19 may be recharged by the batteries on the vehicle. Three separate antenna rods 31 are also mounted within the housing at right angles to one another. These antenna rods may be constructed of appropriate ferrite material, and they may, for example, have a length of the order of one inch.

In the particular embodiment of the transmitter to be described, three separate oscillators are used, all of the same frequency and each connected to a different one of the antenna rods 31. The oscillators are then activated in sequence, so that only one transmitter is on at any particular instant. In this way, a truly omnidirectional effect is achieved, and there is no need for the transmitting unit to have any particular orientation with respect to the vehicle for satisfactory reception by the vehicle of the signal transmitted by the transmitter unit.

The signal radiated by the transmitter of FIG. 1 is preferably magnetic, rather than electromagnetic, so as to have a limited radiation range, similar to the signals radiated in garage door openers, or other similar remotely controlled instrumentalities. The signal from the transmitter is radiated to the vehicle, and is intercepted by the antennas 22 and 24. These antennas are connected to the electronic power control unit 20 which is shown in block form in FIG. 5. It should be pointed out that the various circuits which make up the individual blocks in FIG. 5 are well known per se, and it is believed unnecessary to include a detailed circuit description of the individual components herein.

The electronic power control unit 20, as shown in FIG. 5, includes a difference channel 50 and a sum channel 52. The right antenna 24 and left antenna 22 have a first pair of inductance coils associated with them so that signals representing the difference between the signals received from both antennas are applied to the difference channel 50. The antennas also have further inductance coils associated with them, so that signals representing the sum of the two signals received by the two antennas are applied to the sum channel 52. The difference channel 50 constitutes the channel which produces a "heading error signal," and this error signal drops to zero, as does the difference between the signals applied to the pre-amplifier 54 in the difference channel 50, when the heading of the vehicle corresponds to the direction in which the controlling person is walking. The channel 52, on the other hand, generates a "position error signal," and this position error signal changes amplitude in correspondence with the distance in which the vehicle is from the controlling person, as does the amplitude of the two signals applied to the pre-amplifier 56 in the sum channel 52.

The three signals generated by the transmitter of FIG. 4 have a single predetermined carrier frequency which may, for example, be in a range of 100-400 kilocycles. Each group of four vehicles may, for example, be assigned a different carrier frequency, so that four adjacent vehicles in a golfing foursome, for example, will not be erroneously controlled by each others signals.

The amplified signal from the pre-amplifier 54 in FIG. 5 is amplified in a further amplifier 58 which is of the automatic gain controlled type, and the amplified signal from the amplifier 58 is passed through a filter 60 which passes only the carrier frequency selected for the particular vehicle. The resulting signal passed by the filter 60 is amplified in a buffer amplifier 62 and demodulated in a phase sensitive demodulator 64. The demodulator 64 produces an output signal which is a direct current signal and which has an amplitude dependent upon the heading error of the vehicle with respect to the controlling person, and which has a polarity corresponding to the direction of the heading error.

It should be pointed out that the difference signal applied to the pre-amplifier 54 is in phase with the sum signal applied to the pre-amplifier 56 for a heading error, for example, to the left, and the difference signal applied to the pre-amplifier 54 is in a phase opposition with the sum signal applied to the preamplifier 56 for a right heading error.

The signal from pre-amplifier 56 in the sum channel 52 is applied to an automatic gain control amplifier 66, whose output is passed through a filter 68 to a buffer amplifier 70. The filter 68, like the filter 60, selects the particular carrier corresponding to the controlled vehicle, and only that carrier is amplified by the buffer amplifier 70. The output signal from the buffer amplifier 70 is passed through a limiter 74. As will be described, the signal passed to a phase senitive demodulator 72 and by the buffer amplifier 70 is actually amplitude modulated by an appropriate tone signal which is demodulated by the phase sensitive demodulator 72. The limiter 74 serves to remove any amplitude modulation from the carrier from the buffer 70, so that a reference signal may be provided for the phase sensitive demodulators 64 and 72.

The demodulator 72 produces a signal whose amplitude is actually a measure of the amplitude of the sum signal applied to the pre-amplifier 56, and that signal is a direct current signal which is amplified by a direct current amplifier 75. The amplifier 75 produces a direct current signal which serves to control the gain of the amplifiers 58 and 66, so that the sensitivity of the system will be relatively independent of distance between the transmitters and the vehicle. The amplitude of the direct current output from the amplifier 75 is a measure of the distance of the controlling person from the vehicle, and that signal is used as a position error signal, as will be described.

The demodulator 72 also produces the key tone which is amplitude modulated on the signal, and that key tone is detected in a usual phase locked tone detector 92. The direct current output from the amplifier 75 is fed to a signal monitor 71, and the output from the signal monitor 71, together with the output from the key tone detector 92 is applied to a relay driver 94. The relay driver 94, as will be described in conjunction with FIG. 6, controls the main power relays K1 and K2 of the system. The signal monitor is a threshold circuit, and it passes the direct current signal from the amplifier 75 to the relay driver, only when that signal exceeds a predetermined threshold.

The signal from the monitor 71 together with the detected key tone signal from the detector 92 are required before the relay driver will operate the main power relays of the system, so as to activate the vehicle control system. This means that all signals below a predetermined amplitude threshold are incapable of controlling the unit, so that it is not susceptible to spurious control by extraneous signals. Also, an overriding interference signal of the proper frequency, which would be passed by the filter 68 does not produce a spurious control of the unit, since the interference signal does not have the appropriate key tone modulated on it. Therefore, no signal is produced by the key tone detector 92 in the presence of the overriding interference signal. This means that powerful interfering signals do not produce spurious controls of the vehicle, but merely cause the main power relays of the vehicle to open. The motor controller system is constructed, as will be described, so that immediate dynamic braking is provided for the electric drive motors of the vehicle whenever the main power relays are open.

The heading error signal output from the demodulator 64 is passed through a dynamic compensator 78 to a direct current amplifier 80. The dynamic compensator 78 may be any known type of anti-hunt circuit. A limiter 82 controls the direct current amplifier 80 so that the output of the amplifier 80 is held below a predetermined threshold. The direct current output from the amplifier 75 is fed through a similar dynamic compensator 77, and through a distance setting control potentiometer 79, to a direct current amplifier 86. The amplifier 86 is controlled by a limiter 88 which limits its output to a predetermined value. The amplifier 80 produces the heading error signal, and the amplifier 86 produces the position error signal.

The potentiometer 79 is connected to a negative voltage source, so that when the direct current output from the amplifier 75 drops below a predetermined level, the output from the amplifier 86 becomes negative. This produces a reverse drive on the motors M1 and M2 to brake the vehicle on a downhill run, for example, or to cause the vehicle to back up, whenever the controlling person moves within a predetermined distance from the vehicle. For example, the voltage produced by the DC amplifier 75 may range from 0 to +5 volts, whereas the potentiometer 79 may be connected to a −6 volt source. Then, whenever the output from the amplifier 75 drops, for example, to a value of 2.5 volts, the DC amplifier input becomes negative as does the position error signal produced by it.

The direct current output of the amplifier 80 is applied to a sum amplifier 84 and to a difference amplifier 90, and the direct current output of the amplifier 86 is also applied to the sum amplifier 84 and to the difference amplifier 90. The outputs of the amplifiers 84 and 90 are applied to power amplifiers in the circuit of FIG. 6, as will be described. Whenever there is a heading error signal from the direct current amplifier 80, that signal is applied to the amplifiers 84 and 90 with a polarity dependent upon the heading error, and with an amplitude dependent upon the amount of heading error, and with like polarity. Likewise, the position error signal from the direct current amplifier 86 is applied, with opposite polarities, to the amplifiers 84 and 90, the latter signal having an amplitude dependent upon the distance of the controller from the vehicle.

It will be appreciated that when the heading is proper, the heading error signal is zero, so that the position error signal is applied positively to the amplifier 84 to cause the motor M1 to turn in one direction, and is applied with opposite polarity to the amplifier 90 to cause the motor M2 to rotate in the opposite direction. When the motors M1 and M2 are so driven, both the wheels 12 and 14 of FIGS. 2 and 3 are driven to move the vehicle in a forward direction. When the controlling person moves within the predetermined distance of the vehicle, and as described above, the polarity of the position error signal reverses, so that the wheels are driven in the reverse mode.

Should the controlling person change his direction to the right with respect to the vehicle, a positive error signal resulting from the direct current amplifier 80, for example, causes the motor M1 to rotate more quickly; and causes the motor M2 to rotate more slowly, or to reverse its rotation, so that the desired turning function may be achieved. Likewise, a change in position of the controlling person to the left of the vehicle, causes the heading error signal to be negative, so that the reverse effect is produced. In either instance, the amplitude of the heading error signal is dependent upon the amount of heading displacement of the controlling person with respect to the vehicle.

The limiters 82 and 86 serve to limit the heading and position error signals, so that the heading error signal always predominates. In this manner, when the vehicle is at a maximum distance, so that the position error signal is a maximum, it is never sufficiently dominant, so as to saturate the motors M1 and M2, and cause them to be unresponsive to variations in the heading error signal. In this way, the vehicle always responds to the heading error signals, regardless of its distance from the controlling person.

A switching unit 29, as shown in FIG. 3, is mounted on the vehicle 10, and it includes appropriate manual switches so that the aforesaid dynamic braking function may be removed from the motors M1 and M2 to permit the vehicle to be towed, in the event of power failure. The vehicle carries storage batteries 27, as shown in FIG. 2, which serve to energize the motors and which may be recharged by an appropriate charging system when the vehicle is not in use.

The motor controller circuit of FIG. 6 responds to signals from the sum amplifier 84 and from the difference amplifier 90 of FIG. 5, and also from the relay driver 94. For example, the signals from the difference amplifier 90 are applied to a right power amplifier 100, whereas the signals from the sum amplifier 84 are applied to a left power amplifier 102. The relay driver 94 is connected to the energizing coils of a pair of main power relays K1 and K2. The armatures of the relays K1 and K2 are connected to the motors M2 and M1, as shown. The motors M1 and M2 are connected to the battery 27 which also are connected to the power amplifiers 100 and 102. The batteries apply the required energizing voltages from the motors.

When the relays are energized, the power amplifiers 100 and 102 are connected respectively to the motors M2 and M1. However, when the relays K1 and K2 are not energized, a short circuit is applied across the armatures, so that appropriate dynamic braking may be realized. The switching 29 referred to above is connected to a dynamic brake relay K3. When the switch of the unit 29 is actuated, the dynamic brake relay K3 is de-energized so as to remove the short circuit from the armatures of the motors M1 and M2 and, thereby, remove the dynamic braking. This latter control permis the vehicle to be moved, for example, by towing, in the event of a power failure, and without the dynamic braking which is unwanted under such conditions.

The transmitter system, as shown in FIG. 1 includes three oscillators 200, 202 and 204. Each of these oscillators may be tuned to generate the same selected carrier frequency, which coincides with the frequency at which the particular vehicle to be controlled by the transmitter is responsive. The oscillators are respectively coupled to the various ferrite antennas 21 referred to in conjunction with FIG. 4. The oscillators 200, 202 and 204 are controlled by a sequence generator 206. The sequence generator 206, in turn, is controlled by a tone oscillator 208, and the tone oscillator causes the sequence generator to switch the oscillators 200, 202 and 204 on and off in a sequence, and at a rate determined by the frequency of the tone oscillator.

The result is that each antenna rod 31 generates a burst of oscillation at the carrier frequency. The three antenna rods 31 are positioned at right angles to one another, as mentioned above, so that the transmitter has effective omni-directional characteristics, and at least one of the three signals reaches the receiving antennas 22 and 24 of the vehicle, regardless of the orientation of the transmitter unit. The received bursts of carrier frequency occur at the switching rate of the sequence generator, that is, at the frequency of the tone oscillator 208, when all three signals are received. When one or two of the three signals is received, the bursts occur at a harmonic of the tone oscillator. The key tone detector 92 of FIG. 5 responds to the fundamental or harmonic repetition frequency to generate a signal for the purposes described above.

The invention provides, therefore, an improved remote control system, which is economically and functionally feasible, and which causes a vehicle to be fully and automatically controlled from a remote signal source. It will be appreciated that although a particular embodiment of the invention has been shown and described, modifications may be made, and it is intended in the following claims to cover all the modifications which fall within the spirit and scope of the invention.

What is claimed is:

1. A remotely controlled vehicle comprising: a chassis; a pair of wheels mounted to said chassis; first and second reversible electric motors mechanically coupled to respective ones of said wheels for driving said wheels at variable speeds and in a forward or reverse direction; a forward wheel swivelly mounted to said chassis for rotation about a vertical axis; a pair of antennas mounted on said vehicle at each side thereof and spaced apart from one another for intercepting controlling signals from a remote control source; circuit means coupled to said antennas for producing a first signal representative of the difference in the amplitudes of the signals intercepted by said antennas and for producing a second signal representative of the sum of the amplitudes of the signals intercepted by said antennas; a first electronic system connected to said circuit means and responsive to said first signal for producing a direct current heading signal having an amplitude and polarity representative of the direction of said remote control source with respect to said vehicle; a second electronic system coupled to said circuit means and responsive to said second signal for producing a direct current position signal having an amplitude representative of the distance of the vehicle from said remote control source; and a motor control circuit coupled to said first and second electronic systems and responsive to said direct current heading signal and to said direct current position signal for controlling the speed and direction of rotation of said first and second electric motors.

2. The remotely controlled vehicle defined in claim 1, in which said controlling signals from said source have a predetermined carrier frequency, and in which said circuit means includes filter means for passing only said predetermined carrier frequency.

3. The remotely controlled vehicle defined in claim 1, in which said second electronic system includes circuitry for reversing the polarity of said direct current position signal when said remote control source is within a predetermined distance from said vehicle.

4. The remotely controlled vehicle defined in claim 1, in which said motor control circuit includes relay means for controlling the application of power to said first and second electric motors, and which includes signal monitoring circuit means coupled to said first-named circuit means and responsive to said second signal therefrom for controlling said relay means to prevent the energization of said motors when said second signal is below a predetermined amplitude.

5. The remotely controlled vehicle defined in claim 1, in which said motor control circuit includes relay means for controlling the application of power to said first and second electric motors, and in which the controlling signals from said source include a key tone signal of predetermined frequency, and which includes key tone detector means coupled to said first-named circuit means for detecting said key tone signal, and circuitry coupled to said detector means and responsive to the detected key tone signal for controlling said relay means to prevent the energization of said motors in the absence of said key tone signal.

6. The remotely controlled vehicle defined in claim 1, and which includes signal limiting means in said first and second electronic systems to limit the amplitudes of said heading signal and said position signal so that the amplitude of said heading signal exceeds the amplitude of said position signal for all amplitudes of said position signal.

7. The remotely controlled vehicle defined in claim 1, in which said motor control circuit includes relay means for controlling the application of power to said first and second electric motors, and which includes circuit means controlled by said relay means effectively to short circuit said first and second electric motors to provide dynamic braking for the vehicle when the power is not applied to the motors.

8. The combination defined in claim 1, and which includes a transmitting unit for radiating the aforesaid signals at a predetermined carrier frequency.

9. The combination defined in claim 8, in which said transmitting unit includes three rod-like antennas positioned at right angles to one another, and three oscillators respectively coupled to said antennas.

10. A remotely controlled vehicle comprising: a chassis; a pair of wheels mounted to said chassis; first and second electric motors mechanically coupled to respective ones of said wheels for individually driving said wheels; an electronic control unit responsive to signals from a remote source for producing independent drive signals for said electric motors representative of the direction of and distance to said remote source with respect to said vehicle; a transmitting unit at said remote source for radiating said signals to said electronic control unit at a predetermined carrier frequency, said transmitting unit including three rod-like antennas positioned at right angles to one another, three oscillators respectively coupled to said antennas, a tone generator, and switching means sequentially coupling said tone generator to said oscillators by which said oscillators are activated and de-activated in sequence and at a predetermined tone frequency.

* * * * *